US012722607B2

(12) United States Patent
Lane

(10) Patent No.: US 12,722,607 B2
(45) Date of Patent: Sep. 1, 2026

(54) BATTERY ELECTRIC VEHICLE OPERATOR TO CHARGE TECHNICIAN INTERLOCK

(71) Applicant: Caterpillar Global Mining Equipment LLC, Denison, TX (US)

(72) Inventor: Cameron T. Lane, Oro Valley, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 128 days.

(21) Appl. No.: 18/545,568

(22) Filed: Dec. 19, 2023

(65) Prior Publication Data

US 2025/0196818 A1 Jun. 19, 2025

(51) Int. Cl.

| | |
|---|---|
| ***B60L 50/60*** | (2019.01) |
| ***B60H 1/00*** | (2006.01) |
| ***B60L 1/00*** | (2006.01) |
| ***B60L 3/00*** | (2019.01) |
| ***B60L 53/16*** | (2019.01) |
| ***B60L 53/18*** | (2019.01) |
| ***B60Q 1/44*** | (2006.01) |
| ***B60T 7/16*** | (2006.01) |
| ***G07C 5/08*** | (2006.01) |
| ***H02J 7/70*** | (2026.01) |

(52) U.S. Cl.

CPC ............ *B60T 7/16* (2013.01); *B60H 1/00642* (2013.01); *B60L 3/00* (2013.01); *B60L 50/60* (2019.02); *B60L 53/16* (2019.02); *B60L 53/18* (2019.02); *B60Q 1/44* (2013.01); *H02J 7/70* (2026.01); *B60L 1/003* (2013.01); *B60L 2200/40* (2013.01); *B60T 2270/89* (2013.01); *G07C 5/0825* (2013.01)

(58) Field of Classification Search

CPC ... B60T 7/16; B60T 2270/89; B60H 1/00642; B60L 3/00; B60L 50/60; B60L 53/16; B60L 53/18; B60L 1/003; B60L 2200/40; B60L 53/14; B60L 2200/36; B60L 2250/16; B60Q 1/44; H02J 7/0042; G07C 5/0825; Y02T 10/70; Y02T 10/7072

See application file for complete search history.

(56) References Cited

U.S. PATENT DOCUMENTS

| | | | |
|---|---|---|---|
| 5,202,617 | A | 4/1993 | Nor |
| 8,937,454 | B2 | 1/2015 | Baarman et al. |
| 9,199,546 | B2 | 12/2015 | King |
| 9,393,933 | B2 | 7/2016 | Straugheir |
| 2011/0199204 | A1 | 8/2011 | Dionis et al. |

(Continued)

FOREIGN PATENT DOCUMENTS

| | | |
|---|---|---|
| CN | 204480396 | 7/2015 |

*Primary Examiner* — Michael C Zarroli

(74) *Attorney, Agent, or Firm* — Schwegman, Lundberg & Woessner

(57) ABSTRACT

An electric vehicle includes a battery and an external charging port on the vehicle. A charging interlock system on the vehicle includes a charging interlock module configured to: when engaged by an operator of the vehicle, prevent movement of the vehicle during a battery charging procedure executable by a battery charging technician outside the vehicle and, when disengaged by the battery charging technician following the battery charging procedure, allow movement of the vehicle.

19 Claims, 4 Drawing Sheets

400

402

Engaging, by a vehicle operator, a charging interlock system configured to disable a propulsion system of the vehicle during a battery charging procedure executable by a battery charging technician stationed outside the vehicle

404

Indicating, with a first interlock status indicator on an external surface of the vehicle and observable by the battery charging technician, a status of the charging interlock system

(56) References Cited

U.S. PATENT DOCUMENTS

| | | | | |
|---|---|---|---|---|
| 2016/0052409 | A1* | 2/2016 | Sun | B60L 53/62 320/109 |
| 2019/0067961 | A1* | 2/2019 | King | H02J 7/0045 |
| 2021/0237608 | A1* | 8/2021 | Ghannam | B60L 53/16 |
| 2022/0024331 | A1* | 1/2022 | Baumann | B60L 3/0069 |
| 2022/0285959 | A1* | 9/2022 | Namuduri | H02J 7/865 |
| 2024/0075829 | A1* | 3/2024 | Rowland | B60L 53/16 |

* cited by examiner

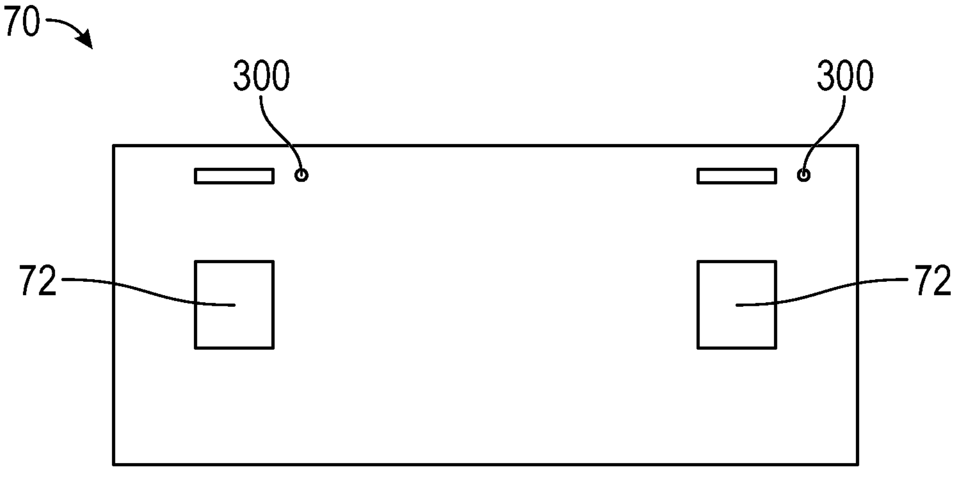

Engaging, by a vehicle operator, a charging interlock system configured to disable a propulsion system of the vehicle during a battery charging procedure executable by a battery charging technician stationed outside the vehicle

404

Indicating, with a first interlock status indicator on an external surface of the vehicle and observable by the battery charging technician, a status of the charging interlock system

FIG. 5

BATTERY ELECTRIC VEHICLE OPERATOR TO CHARGE TECHNICIAN INTERLOCK

TECHNICAL FIELD

This disclosure relates to an interlock system for an electric vehicle, particularly large work vehicles. During battery charging procedures, a battery charging technician external to the vehicle connects and disconnects charging cables to the vehicle. The interlock system immobilizes the vehicle during battery charging procedures.

BACKGROUND

The battery packs in large electrically powered work vehicles such as, for example, dump trucks, excavators, garbage trucks, buses, cement mixers, cranes, compactors, forklifts, and the like, can need frequent recharging. For example, a large dump truck used in mining operations, which can be over 20 feet tall and 50 feet long, can have a weight, including fuel and tires, of up to 500,000 pounds, and a payload of up to 1 million pounds. These large vehicles operate substantially continuously at a work site and can require battery recharging every 1-2 hours.

Some battery charging procedures for heavy duty work vehicles are described in, for example, U.S. Pat. Nos. 5,202,617 and 9,199,546, as well as U.S. Published Patent Application No. US 2011/0199204.

During battery recharging procedures, which in some cases can take about 20-30 minutes, an operator can remain in the cab of the vehicle, particularly during adverse weather conditions. To commence the charging procedure, the vehicle parks at a charging station, and a charging technician on the ground outside the vehicle plugs charging cables into a charging port on the body of the vehicle. When the charging procedure is complete, the charging technician unplugs the charging cables from the vehicle, and the vehicle can depart the charging station to resume work.

SUMMARY OF THE INVENTION

In one aspect, the present disclosure is directed to an interlock system for an electrical vehicle with a human or a remote operator. When activated, the interlock system of the present disclosure can prevent movement of the vehicle during, or for a predetermined time period after, charging procedures.

In some examples, the interlock system can be configured to disable the propulsion system of the vehicle, apply the parking brake of the vehicle, or lock the parking brake of the vehicle into an engaged position, which can prevent motion of the vehicle during battery charging procedures. In other examples, the interlock system can disable motion of the vehicle while other operations such as, for example, cab power and heating, ventilation and air conditioning (HVAC), are maintained so that the operator can optionally remain in the cab during charging procedures. In some examples, the interlock system of the present disclosure can be configured to maintain the operation of auxiliary heating and cooling systems during battery charging procedures, which can extend the service life of propulsion system components.

BRIEF DESCRIPTION OF THE DRAWINGS

FIG. 4 is a schematic view of a charging port and associated displays indicating locking status of the charging cables from the charging station.

FIG. 5 is a flow chart of a method of charging an electric vehicle according to an embodiment of the present disclosure. Like symbols in the drawings represent like elements.

DETAILED DESCRIPTION

Figures 1A, 1B:
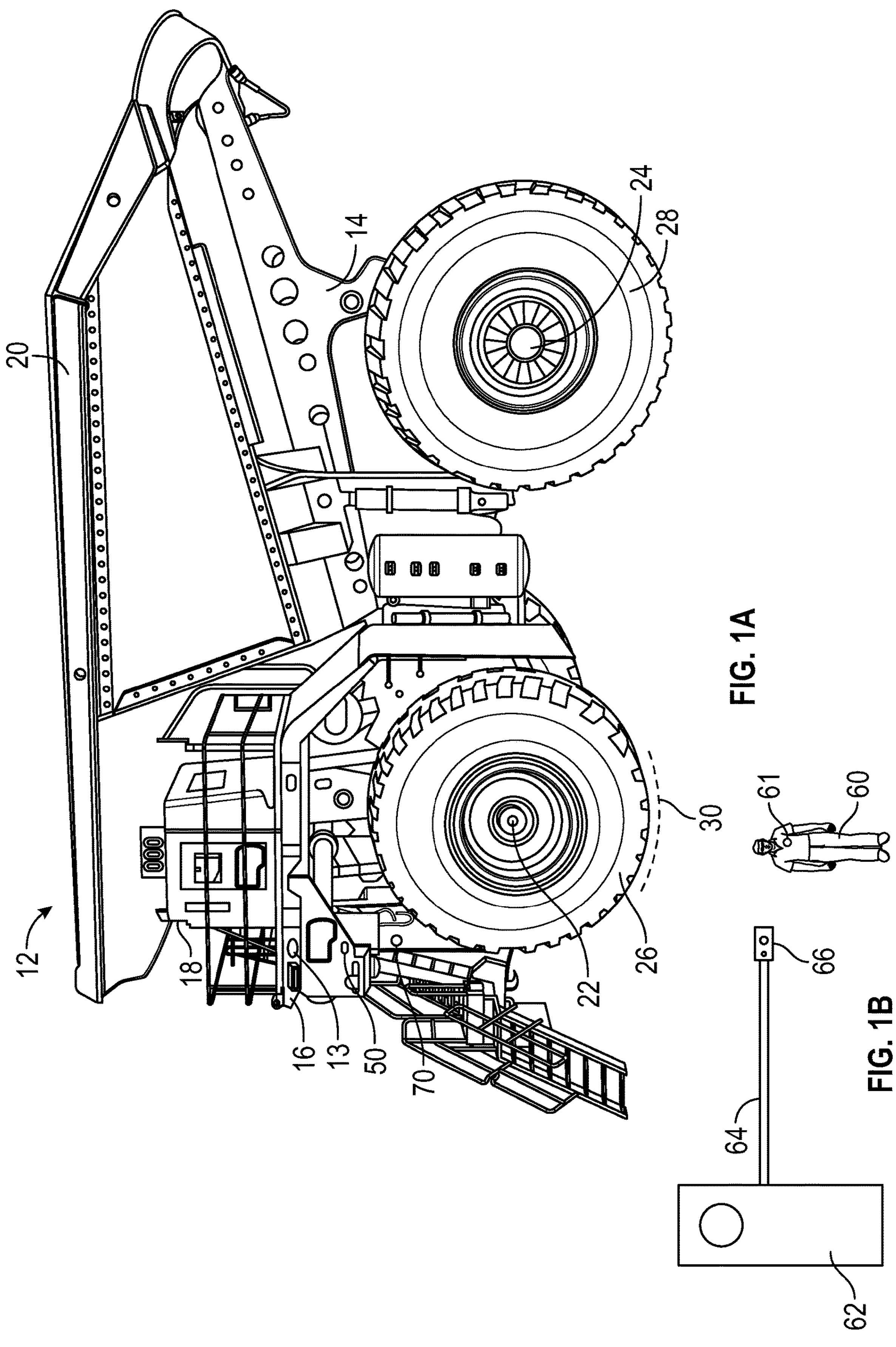
FIG. 1A is a schematic side view, which is not to scale, of an example embodiment of a heavy-duty electric vehicle including an interlock system according to the present disclosure.
FIG. 1B is a schematic representation of a battery charging station and apparatus used to charge the battery pack in the electric vehicle of FIG. 1A.

FIG. 1A shows a heavy-duty hybrid or electric work vehicle 12. In the embodiment shown in FIG. 1, the electric vehicle 12 includes a frame 14 having mounted thereon a body 16, a cab 18 including a cockpit for a human operator, and a dump body 20. Tires 26, 28 are mounted to front and rear axles 22, 24. The electric vehicle 12 can be controlled by an operator at a remote location, and may not require a human operator within the cab 18.

Figure 2:
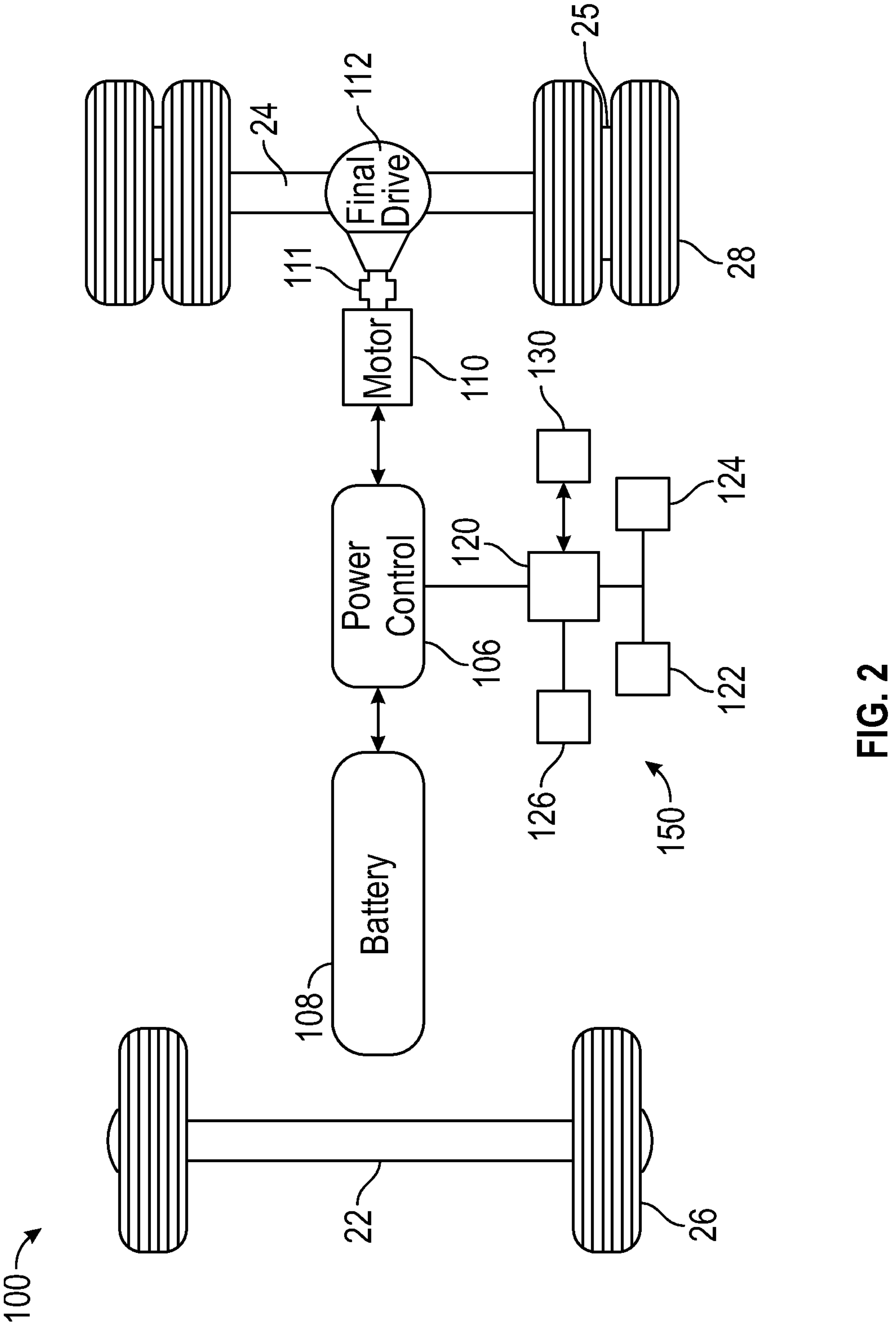
FIG. 2 is a schematic overhead view of an embodiment of a propulsion unit for the electric vehicle of FIG. 1A.

Referring now to FIG. 2, a propulsion system 100 of the vehicle 12 is shown, which is not intended to be limiting, and is provided as an example. The propulsion system 100 includes a power control module 106, which is electrically connected to a battery pack 108. Electrical energy from the battery pack 108 is controlled by the power control module 106 and input into one or more electric motors 110. In some examples, the electric motors 110 drive a driveshaft 111, which connects to a differential 112 with a final drive gearset to deliver power to the rear axle 24 and the rear tires 28. In some examples (not shown in FIG. 2), the propulsion system 100 can include multiple electric motors directly driving a final drive gearset in each wheel, and may not require a driveshaft 111 or a differential 112.

The propulsion system 100 of the vehicle 12 further includes a battery charging interlock system 150 controlled by an interlock control module 120. When the interlock system 150 is engaged, in some examples the interlock module 120 is configured to send control signals to the power control module 106 to disable the electric motor 110 and propulsion unit 100 to prevent further forward or reverse motion of the vehicle 12. In some examples, the interlock module 120 can be configured to disable other functions of the vehicle 12. For example, the interlock module 120 can disengage the actuation of implements on the vehicle 12 such as the dump body 20 (FIG. 1), disengage vehicular steering, actuate, or lock into an engaged position, a parking brake 25, and combinations thereof. For example, the interlock module 120 can be configured to simultaneously disable the propulsion unit 100 and actuate the parking brake 25 to prevent vehicular motion during, or for a predetermined period of time after the completion of, vehicular charging procedures.

While not shown in FIG. 2, the interlock system 150 and the interlock module 120, or a computer on or remote from the vehicle 12 connected thereto, can include main components such as a processors (e.g., a central processing unit (CPU) or other main processor operated by software); memory (e.g., one or more volatile or non-volatile RAM memory device, such as DRAM, mobile or low-power double-data-rate synchronous DRAM (DDR SDRAM), etc.); and a storage device (e.g., non-volatile memory (NVM) device, such as flash memory, ROM, a solid-state drive (SSD), a MultiMediaCard (MMC), or other memory card structure or assembly, etc.). In certain examples, the interlock module 120 can include a user interface (e.g., a display, touch-screen, keyboard, one or more buttons, etc.), a graphics processing unit (GPU), a power management circuit, a baseband processor or one or more transceiver circuits, and the like.

In some examples, the interlock system 150 further includes one or a plurality of interlock status indicators 122, 124. The interlock status indicators 122, 124 can include one or a plurality of indicator lights 50 on the frame 14 or chassis of the vehicle, or an indicator light 301 on a dashboard in the cab 18 of the vehicle 12 (see FIGS. 3A-3B).

Referring again to FIGS. 1-4, in some examples the indicator lights 50 indicating the status of the interlock system 150 are positioned on the frame 14 of the vehicle 12 to be readily visible to a human battery charging technician or robotic charging system 60 on the ground outside of the cab 18 of the vehicle 12.

For example, the battery charging technician 60 can operate a battery charger 62 (FIG. 1B), which includes one or more charging cables 64 terminated with charging cable connectors 66. The charging cable connectors 66 are configured to engage one or more corresponding power port connectors 72 (FIG. 4) in a power port 70 on the frame 14, which is electrically connected to the battery pack 108 of the vehicle 12.

To initiate procedures to charge the battery pack 108 of the vehicle 12, the vehicle 12 is maneuvered by the operator in the cab 18, or by a remote operator, into the charging station 10, and the front tires 26 are optionally positioned in a specific location such as, for example, a park-up charging loc 30. The operator then engages a PARK condition on the vehicle 12.

The interlock system 150 is then engaged via a switch 126, which can be moved to a "ready to charge" position by an operator in the cab 18, or by an operator at a location remote from the cab 18, via instructions to or from a computer 130 to the interlock module 120. For example, the computer 130 can include a laptop or tablet operated by the charging technician 60, or a computer operated from a location remote from the vehicular charging station. The switch 126 activates the interlock module 120, which can be configured to send control signals to other vehicle components to enable or disable one or more selected functions of the vehicle 12. For example, the interlock module 120 can be configured to disengage the motor(s) 110 from the final drive of the vehicle to temporarily disengage the propulsion system 100. In another example, the interlock module 120 can be configured to actuate or lock the parking brake 25 of the vehicle, to prevent motion of the vehicle 12.

In some examples, the interlock module 120 can optionally send control signals to deactivate the HVAC system or other controls in the cab 18 to reserve battery power or, in the alternative, to maintain the operation of the HVAC system and controls in the cab 18 to ensure the comfort of the operator during the charging procedure. The interlock module 120 can also send control signals to the power control module 106 as needed to maintain the operation of auxiliary cooling or heating systems to extend the service life of, or prevent damage to, components of the propulsion system 100.

Figures 3A, 3B:
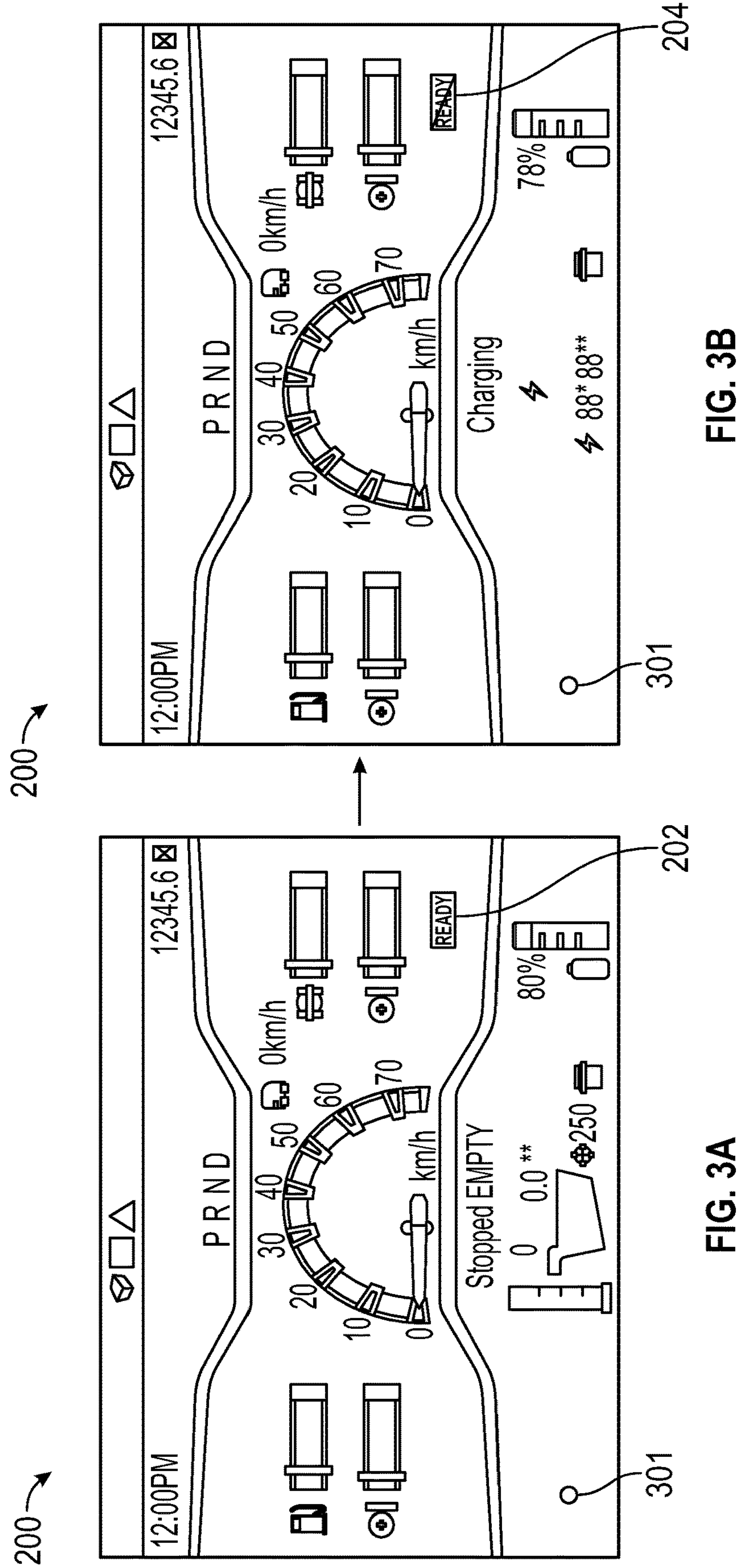
FIGS. 3A-3B are views of an example in-cab or remote display indicating the status of the interlock system of the present disclosure.

When engaged, the interlock module 120 can be configured to send status information to one or more of the status indicators 122, 124. For example, an example of a dashboard display 200 within the cab 18, or displayable at a remote location, is illustrated in FIG. 3A, and includes a "ready to run" indicator 202 illuminated when the interlock system is disengaged. The indicator 202 changes to a "not ready to run" indicator 204 (FIG. 3B) when the interlock module 120 is engaged. In another example, engagement of the interlock module 120 can initiate one or more of illumination, color change, or flashing of one or more of the lights 50 on the frame 14 of the vehicle 12. These changes of the illumination state of one or more of the lights 50 can indicate to the charging technician 60, or a remote operator, that the vehicle 12 can be approached to begin the battery charging procedure. The status indicators 122, 124 thus provide a clear status indication for the interlock module 120 that can be readily viewed by both the operator in the cab 18 (or a remote operator) and the battery charging technician 60 on the ground outside the vehicle 12.

To further advise the battery charging technician 60, in some examples the cab 18 or the frame 14 of the vehicle 12 may optionally include one or more cameras 13 (FIG. 1A) to monitor the location of the technician 60. The images from the camera 13 may be viewable in the cab 18 or at a remote location. In another example, the technician 60 may optionally wear a trackable device such as a RFID tag 61 (FIG. 1A) to provide location information to the operator in the cab 18, or to an operator at a remote location.

Referring again to FIG. 4, after the interlock module 120 is engaged, to initiate the battery charging procedure, the battery charging technician 60 opens a door (not shown in FIG. 4) to the vehicle power port 70, removes any protective covers on the one or more power port connectors 72 in the power port 70, and inserts a charging cable connector 66 on the charging cable 64 into each of the power port connectors 72.

In some examples, as shown schematically in FIG. 4, a location within, or adjacent to, the power port 70, may optionally include one or more displays 300 indicating the locked/unlocked status of the charging cable connector 66 and the charging cable 64 within each of the power port connectors 72 prior to, during, or after the battery charging procedure. In some examples, one or more displays 300 may be located on the frame 14 of the vehicle 12 in an area readily visible to the charging technician 60.

In another example, the dashboard display 200, a console above the display 200 in a line of sight of the operator in the cab 18, or a display at a remote location, may include an optional charging status indicator 301 that shows the door of the power port 70 is open or closed, as well as an optional status indicator indicating the progress of the charging procedure.

Once the battery charging procedure is complete, which in some examples can take from about 20 minutes to about 2 hours, the battery charging technician 60 may remove the charging cable connector 66 from each of the one or more power port connectors 72 in the power port 70. The status indicators 300, 301 indicate to at least one of the charging technician 60, a remote monitor, or the operator in the cab 18, that the charging cable connectors 66 are in a disengaged state. The battery charging technician may then remove and store the charging cables 64, close the door to the receptacle 70, and move away from the vehicle 12.

As the charging technician 60 moves away, the charging technician 60 maintains complete control of the interlock system 150. In some examples, the interlock module 120 may be manually disengaged by the charging technician by cycling a remote lockout that may be handheld, or mounted on the frame 14 of the vehicle 12. Once the interlock system 150 is disengaged, motion of the vehicle 12 is again possible.

In some examples, the interlock module 120 may optionally include a timer, activated by the charging technician 60, that maintains a predetermined lockout time period after the charging cable connectors 66 are removed and the door to the charging port 70 is closed, or following completion of the battery charging procedure and movement to the battery charging technician to a standby position. In some examples, the lockout time period can range from about 10 seconds to about 60 seconds, or about 30 seconds to about 40 seconds, to provide sufficient time for the battery charging technician 60 to store the charging cables 64 and ensure all equipment is out of the way of the path of the vehicle 12.

Once the interlock system 150 is disengaged manually by the charging technician 60, or by the expiration of the lockout time period activated by the charging technician 60, the "not ready to run" indicator 204 in the dashboard display 200 (FIG. 3B), or on a display at a remote location, changes to indicate a "ready to run" status as shown on the "ready to run" indicator 202 (FIG. 3A). The disengagement of the interlock system 150 also changes the illumination state of the one or more of lights 50 on the body 16 of the vehicle 12. For example, one or more lights 50 may illuminate or turn off, change color, or flash, which can indicate to the battery charging technician 60 that the vehicle 12 is ready to depart the charging station 10 and move away from the park-up ditch 30 (FIG. 1A).

In another example, the battery charging technician 60 can utilize a computing device such as a tablet to disengage the interlock system 150 and change the illumination status of one or more of the dashboard displays 200 and the lights 50. In another example, the interlock system 150 can only be disengaged by the charging technician 60 after the charging cables 64 are removed from the charging port 70 and the location information from the RFID tag 61 on the technician 60 confirms that the charging technician 60 is positioned in a predetermined location.

Referring now to FIG. 5, in another aspect, the present disclosure is directed to a method 400 for charging an electric vehicle.

In step 402, the method 400 includes engaging, by an operator of the vehicle, a charging interlock system configured to disable a propulsion system of the vehicle during a battery charging procedure executable by a battery charging technician stationed outside the vehicle.

In step 404, the method 400 includes indicating, with a first interlock status indicator on an external surface of the vehicle and observable by the battery charging technician, a status of the charging interlock system.

Referring again to FIGS. 1-4, in another example, the present disclosure is directed to a battery charging system for an electric vehicle 12. The battery charging system includes a battery charging port 70 on an exterior of the vehicle 12. An electric charging station 62 including a cable 64 terminated with a charging cable connector 66 is configured to engage a power port connector 72 in the battery charging port 70 during a battery charging procedure executable by a battery charging technician 60 stationed outside the vehicle. A charging interlock system 150 is configured to allow a vehicle operator to disable a propulsion system 100 of the vehicle 12, or prevent motion of the vehicle 12, during the battery charging procedure. In some examples, the charging interlock system includes an interlock status indicator on an external surface of the vehicle that is observable by the battery charging technician 60.

INDUSTRIAL APPLICABILITY

The foregoing battery charging interlock assemblies can be used as a component of an electric vehicle 12 that includes a battery 108 and an external charging port 70. The charging interlock system includes a charging interlock module 120. When engaged, the charging interlock module 120 prevents movement of the vehicle 12 during a battery charging procedure executable by a battery charging technician 60 outside the vehicle 12. When disengaged by the battery charging technician 60 following the battery charging procedure, the charging interlock 120 module allows movement of the vehicle 12 to resume.

What is claimed is:

1. An electric vehicle comprising a battery and an external charging port on the vehicle, the vehicle further comprising:

a charging interlock system comprising a charging interlock module configured to:

when engaged, prevent movement of the vehicle by disabling a propulsion system powering the vehicle during a battery charging procedure executable by a battery charging technician outside the vehicle, and when disengaged by the battery charging technician following the battery charging procedure, allow movement of the vehicle by enabling the propulsion system.

2. The vehicle of claim 1, wherein the charging interlock module is engaged from within a cab of the electric vehicle by an operator of the vehicle.

3. The vehicle of claim 1, wherein the charging interlock system comprises at least one interlock status indicator on the vehicle.

4. The vehicle of claim 3, wherein the interlock status indicator comprises at least one light on a frame of the vehicle.

5. The vehicle of claim 3, wherein the interlock status indicator comprises at least one display in a cab of the vehicle.

6. The vehicle of claim 3, wherein the interlock status indicator comprises at least one light proximal the external charging port on the vehicle.

7. The vehicle of claim 1, wherein the interlock system comprises a switch actuatable by the battery charging technician to disengage the charging interlock system.

8. The vehicle of claim 1, wherein the interlock system is configured to:

when engaged, apply a vehicle parking brake or lock the vehicle parking brake into an engaged position, and, when disengaged, allow an operator of the vehicle to remove the vehicle parking brake.

9. The vehicle of claim 1, wherein the interlock system is configured to, when engaged, maintain at least one of controls and heating, ventilation and air conditioning (HVAC) in a cab of the vehicle.

10. A method for charging an electric vehicle, the method comprising:

engaging, from within a cab of the electric vehicle by an operator of the vehicle, a charging interlock system configured to disable a propulsion system of the vehicle prior to a battery charging procedure executable by a battery charging technician stationed outside the vehicle, and indicating, with a first interlock status indicator on the vehicle and observable by the battery charging technician, a status of the charging interlock system.

11. The method of claim 10, further comprising disengaging, by the battery charging technician, the charging interlock system when the battery charging procedure is complete.

12. The method of claim 10, further comprising indicating, with a second interlock status indicator in the cab of the vehicle, a status of the charging interlock system.

13. The method of claim 10, further comprising engaging the charging interlock system to engage a parking brake of the vehicle, and disengaging the charging interlock system to allow the vehicle operator to disengage the parking brake of the vehicle.

14. The method of claim 10, further comprising maintaining operation of, with the charging interlock system, power and heating, ventilation and air conditioning (HVAC) in a cab of the vehicle during the battery charging procedure.

15. The method of claim 13, wherein the first status interlock indicator comprises at least one light on a frame of the vehicle.

16. The method of claim 12, wherein the second interlock status indicator comprises an indicator on a dashboard in a cab of the vehicle.

17. The method of claim 10, wherein the engaging comprises actuating, by the charging technician, a switch to disengage the charging interlock system.

18. A battery charging system for an electric vehicle, the system comprising:

a battery charging port on an exterior of the vehicle;

an electric charging station external to the vehicle, wherein the battery charging station comprises a charging cable with a charging cable connector configured to engage a power port connector in the battery charging port during a battery charging procedure executable by a battery charging technician outside the vehicle; and a charging interlock system configured to be engaged at a location remote from the battery charging port and the electric charging station to disable movement of the vehicle, and when disengaged by the battery charging technician, enable movement of the vehicle upon completion of the battery charging procedure.

19. The system of claim 18, wherein the charging interlock system comprises an interlock status indicator on an external surface of the vehicle.

* * * * *